United States Patent [19]

Popper

[11] Patent Number: 4,711,423
[45] Date of Patent: Dec. 8, 1987

[54] SHOCK AND VIBRATION MOUNT

[75] Inventor: Jakhin B. Popper, Kiryat Haim, Israel

[73] Assignee: Popper Technologies (1983) Ltd., Kiryat Haim, Israel

[21] Appl. No.: 853,180

[22] Filed: Apr. 17, 1986

[30] Foreign Application Priority Data

Apr. 21, 1985 [IL] Israel .................................. 74976

[51] Int. Cl.⁴ .............................................. F16F 7/00
[52] U.S. Cl. .................................. 248/635; 248/638; 267/141.3
[58] Field of Search ............... 248/615, 562, 622, 632, 248/634, 635, 636, 638; 267/141, 141.1, 141.2, 141.3, 141.4, 141.5, 141.6, 141.7, 140.1

[56] References Cited

U.S. PATENT DOCUMENTS

| 1,822,026 | 9/1931 | Guy ..................... | 267/141.1 |
| 2,037,032 | 4/1936 | Lord .................... | 267/141.6 |
| 2,538,658 | 1/1951 | Saurer .................. | 267/141.5 |
| 2,926,881 | 3/1960 | Painter ................. | 267/141.4 |
| 2,987,291 | 6/1961 | Dyson ................... | 267/141.4 |
| 4,288,063 | 9/1981 | Brenner ................. | 248/635 |

FOREIGN PATENT DOCUMENTS

| 452673 | 11/1948 | Canada ............................. | 267/141.1 |
| 975122 | 8/1961 | Fed. Rep. of Germany ... | 267/141.3 |
| 926848 | 10/1947 | France ............................. | 267/141.7 |
| 1047112 | 12/1953 | France ............................. | 248/562 |
| 563799 | 7/1957 | Italy ............................... | 267/141.3 |
| 327060 | 1/1958 | Switzerland ....................... | 248/632 |
| 616689 | 1/1949 | United Kingdom ................ | 248/635 |
| 896762 | 5/1962 | United Kingdom ................ | 267/141.5 |

Primary Examiner—J. Franklin Foss
Assistant Examiner—Robert A. Olson
Attorney, Agent, or Firm—Benjamin J. Barish

[57] ABSTRACT

A shock and vibration mount for mounting a supported device to a supporting device comprises a first electric member between two rigid members such as to be strained only in compression under loads along a first orthogonal axis, and to be strained only in shear under loads along a second orthogonal axis; and a second elastic member between one of the mentioned two rigid members and a third rigid member disposed in series with the first elastic member such as to be strained only in shear under loads along the first orthogonal axis and to be strained only in compression under loads along the second orthogonal axis. Both elastic members are of elastomeric material having a low shear modulus as compared to the compression modulus so as to exhibit relatively low deflection under compression and relatively high deflection under shear.

20 Claims, 9 Drawing Figures

SHOCK AND VIBRATION MOUNT

BACKGROUND OF THE INVENTION

The present invention relates to shock and vibration mounts, such as are used for mounting a supported device, e.g. a piece of electronic equipment, to a supporting surface, e.g. a frame or rack.

In principle, most shock and vibration mounts represent springs assigned to flex in every direction. With the nominal load "W" and the natural frequency "$f_m$" given, the static deflection $\delta_n$ results according to the equation:

$$\delta_n = \frac{g}{(Q\pi f_m)^2} \quad (1)$$

where "g" is the earth acceleration.

The maximal expected acceleration ("g") is indicated as "i". Hence the energy "Q" to be stored by the mount becomes a specified magnitude, calculated by the equation:

$$Q = \tfrac{1}{2} W \times \delta_n \times i \quad (2)$$

On the other hand the net material volume V of every spring is $$V = Q \frac{aE}{\Sigma^2} \quad (3)$$

where: "a" is a constant of the spring configuration.
E is the elastic modulus, and
$\Sigma$ is the max stress.

In pure shear, the elastomers of today allow the smallest material volume (V) of eq. (3), due to the low shear modulus and an a=2, the minimal possible constant.

In practice, it is desirable to reduce the volume (V) of the mount in order to minimize the space which must be left free for the mounts. It is particularly desirable that the mount have a profile which is as low as possible, since in most applications the height of the mount is a critical factor in determining the amount of "idle space" which must be made available in order to accomodate the mounts. Another desirable characteristics of such mounts is that they possess a low natural frequency, i.e., a large static deflection ($\delta_n$) per equation (1). This is because the maximal expected eccelleration load at the lower frequencies are generally lower due to the fact that the frequency appears in the second power in the following equation:

$$ig = A(Q\pi f_m)^2 \quad (4)$$

wherein "A" is the vibrational amplitude. Because of the low shear modulus (E) in the shear mode, the static deflection ($\delta_n$) will be higher per the following equation:

$$\delta_n = \frac{WH}{ES} \quad (5)$$

"H" is the height of the mount, "W" is the supported weight; and "S" is the strained area of the elastomer.

With a lower natural frequency ($\phi_m$) the shock transmissability is also reduced.

Further desirable characteristics of such mounts is that they should flex equally in all directions, and that they should never "bottom". That is, even if loaded beyond the maximum, the deflecting member should never effect a metal contact; rather it should stiffen gradually to prevent excessive deflections.

An object of the present invention is to provide a shock and vibration mount having advantages in some or all of the above respects.

BRIEF SUMMARY OF THE INVENTION

According to the present invention, there is provided a shock and vibration mount for mounting a supported device to a supporting device, comprising: a first rigid member to be mounted to the supporting device; a second rigid member to be mounted to the supporting surface; a third rigid member between the first and second rigid members; a first elastic member between the first and third rigid members such as to be strained only in compression under loads along a first orthogonal axis, and to be strained only in shear under loads along a second orthogonal axis; and a second elastic member between the second and third rigid members and disposed in series with the first elastic member such as to be strained only in shear under loads along the first orthogonal axis, and to be strained only in compression under loads along the second orthogonal axis; both the elastic members having a low shear modulus as compared to the compression modulus so as to exhibit relatively low deflection under compression and relatively high deflection under shear.

It will thus be seen that, with the two elastic members in series, if the mount is loaded axially (the first orthogonal axis referred to above), one elastic member is strained in compression and the other is strained in shear; whereas when a radial load is applied, the first elastic member is strained in shear and the second is strained in compression. The stressed areas of the two elastic members are preferably substantially equal, so that the deflections of the two members are related to the relation between the shear and compression modula, which is of the order of magnitude of number 5÷8.

In other words, the initial loading will produce mainly a shear deflection, which is practically linear. Small compression and tension strains also display a linear behaviour. As soon as the sheared elastic element reaches its maximum allowed deflection, its further deflection is limited, but then the elastic member under compression takes up the load to prevent bottoming.

The foregoing operation of the shock and vibration mount constructed in accordance with the foregoing features will be better understood by reference to FIG. 1 to be more particularly described below.

According to the preferred embodiments of the invention described below, the two elastic members are both of elastomeric material. In addition, at least one of the elastic members includes at least two sections of elastomeric material separated by a rigid layer parallel to the plane of shear to stiffen the behaviour of the elastic member under compression without significantly effecting its behaviour under shear. Preferably, the rigid layer is of metal to thereby also enhance the dissipation of heat generated in the elastic member when subjected to vibration.

Shock and vibration mounts may be constructed in accordance with the present invention having a minimum volume and particularly a minimum height, having a low natural frequency, flexing substantially equally in all directions, and not "bottoming" even under accesive loads.

Further features and advantages of the invention will be apparent from the description below.

BRIEF DESCRIPION OF THE DRAWINGS

The invention is herein described, by way of example only, with reference to the accompanying drawings, wherein.

DESCRIPTION OF PREFERRED EMBODIMENTS

Figure 2:
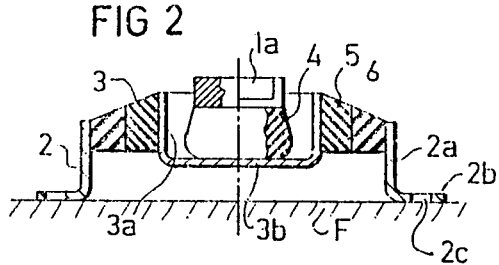
FIG. 2 is a sectional view illustrating one form of mount constructed in accordance with the present invention.
Figure 3:
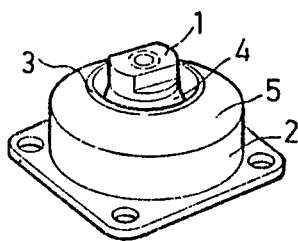
FIG. 3 is a three dimensional view of the mount of FIG. 2.

The shock and vibration mount illustrated in FIGS. 2 and 3 of the drawings comprises a first rigid member 1 to be mounted to the supporting device, such as a piece of electronic equipment; and a second rigid member 2 to be mounted to the supporting surface, such as a frame or chassis. For this purpose, rigid member 1, which may be of metal, is formed with a central opening 1a which may be threaded for receiving a fastener secured to the device to be mounted; and rigid member 2, which may also be of metal, is formed with an annular wall 2a terminating in an annular flange 2b formed with mounting house 2c for receiving fasteners to be attached to the frame or chassis.

The mount illustrated in FIGS. 2 or 3 further includes a third rigid member 3 between members 1 and 2. Rigid member 3, which may also be of metal, is formed with an annular wall 3a coaxial with and interposed between, members 1 and 2, and with a bottom wall 3b which is spaced below the bottom of member 1 and the mounting flange 2b of member 2.

The mount illustrated in FIGS. 2 and 3 includes two elastic members 4 and 5. Thus, elastic member 4 is interposed between the bottom surface of member 1 and bottom wall 3b of member 3; and elastic member 5 is interposed between the side wall 3a of member 3 and the annular wall 2a of member 2. Elastic members 4 and 5 are fixed, as by the use of an adhesive, to their respective contacting surfaces of the rigid members 1, 2 and 3.

Elastic members 4 and 5 are made of elastomeric material, e.g., natural or synthetic rubber. In such materials, the shear modulus is very low compared with the compression modulus, so that each member exhibits relatively low deflection under compression and relatively high deflection under shear.

It will thus be seen that under axial loads, elastic member 4 will be strained only in compression and will undergo very little deflection, whereas elastic member 5 will be strained only in shear and will undergo substantial deflection. Thus, the deflection of elastic member 5 will dominate the total deflection of the mount, and this deflection will be relatively linear as shown in the first portion of the diagram of FIG. 1.

The shear deflection of elastic member 5 will be limited by the engagement of the bottom wall 3d against the supporting surface, and as soon as this occurs, elastic member 4 will be strained only in compression. Since its deflection in compression is very low, it gradually stiffens to prevent exessive deflections but never actually "bottoms", such as would be involved in the engagement of two rigid members. The deflection of the mount during the compression of elastic member 4 is illustrated in the second portion of the diagram of FIG. 1, wherein it will be seen that relatively small deflection is produced by the increasing axial load.

The same operation occurs when the mount is subjected to radial loads, except in this case elastic member 4 is strained in shear and elastic member 5 is strained only in compression. Thus, during the initial radial load, elastic member 4 is strained in shear until it, or rigid member 1 to which it is secured, limits against the side walls 3a of rigid member 3, thereby producing the initial linear deflection illustrated in FIG. 1; and thereafter an increasing radial load will strain elastic member 5 in compression, thereby producing the latter portion of the curve illustrated in FIG. 1.

Preferably, the two elastic members 4 and 5 are constructed with approximately the same cross-section and length. Thus, if the ratio between the compression and tension moduli is 7, a 6 mm deflection of the elastic member strained in shear will be accompanied by less than 1 mm deflection of the elastic member strained in compression.

If the static deflection ($\delta_n$) is 2 mm, this corresponds to a relatively low natural frequency of 11 cps; the total deflection of 7 mm enables an acceleration of i=7/2, i.e. 3.5 g/$^2$ which is also a very desirable characteristic. Further, the foregoing structure permits a minimum volume of the mount, and particularly a minimum height since in order to produce a deflection of 6 mm in shear, it is not necessary to have a member having a large "H" (see FIG. 2).

It is quite easy to make the cross-sections and heights (H) equal in the two elastic members 4 and 5 in order to obtain substantial equal elastic and vibrational behaviour in all directions. Preferably, if elastic member 5 increases in radius, it is correspondingly reduced in thickness in order to produce a constant cross-section.

If an elastomer is deflected in compression, it bulges out. Consequently, the outer layers must expand. This additional expansion results in a non-linear rate which increases with deflection. This is the reason why a linear behaviour is incompatable with compression loading.

An elastomer in shear is also subjected to bending, which is actually a compression extension loading mode. Therefore, elastic member 5 is preferably constituted of two (or more) sections 5a, 5b of elastomeric material separated by a rigid layer 6 parallel to the plane of shear, in order to stiffen the elastic member 5 under compression without significantly affecting it in shear.

Rigid layer 6 is preferably of metal, to thereby also enhance the dissipation of heat generated in this elastic member when the mount is subjected to vibrations.

It will be appreciated that elastic member 4 could be similarly constructed with two or more sections separated by a rigid layer parallel to the plane of shear, if the application of the mount is such that it would be subjected to frequent and large radial loads.

Figure 4:
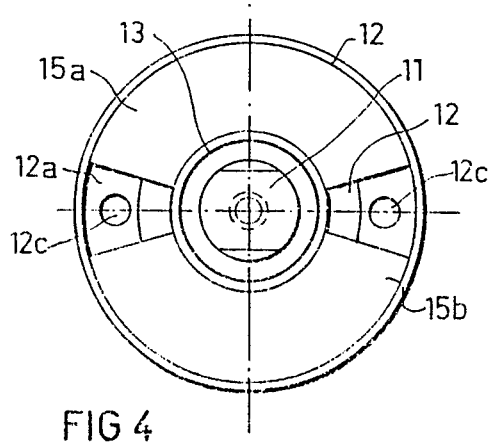
FIG. 4 is a bottom plan view illustrating a variation in the construction of the mount of FIGS. 2 and 3.
Figure 5:
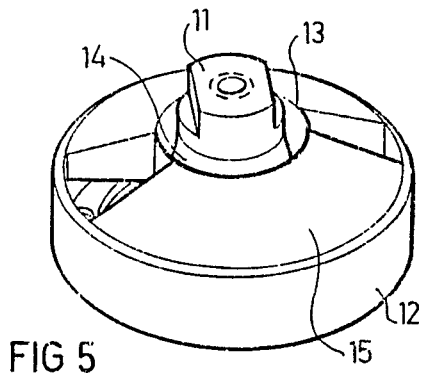
FIG. 5 is a three dimensional view of the mount of FIG. 4.

FIGS. 4 and 5 illustrate a mount similar to that of FIGS. 2 and 3 except modified in order to save floor space occupied by the mount. Thus, the mount illustrated in FIGS. 4 and 5 includes the same basic elements as that illustrated in FIGS. 2 and 3, namely the three rigid members 11, 12, 13 corresponding to rigid members 1, 2 and 3, and the two elastic members 14 and 15, corresponding to members 4 and 5 in FIGS. 2 and 3. Elastic member 15, however, is divided into a plurality of sections 15a, 15b, to define spaces between them 17a, 17b for receiving the mounting lugs 12a, 12b integrally formed with the outer rigid member 12. Mounting lugs 12a, 12b, formed with the openings for receiving the fasteners, are bent inwardly into the spaces 17a, 17b between the two sections 15a, 15b of the elastic member 15.

Elements 11-15 in the mount of FIGS. 4 and 5 are otherwise constructed, and operate in the same manner, as elements 1-5, respectively, in the mount of FIGS. 2 and 3, with the two sections 15a, 15b of elastic member 15 operating in parallel.

Figure 6:
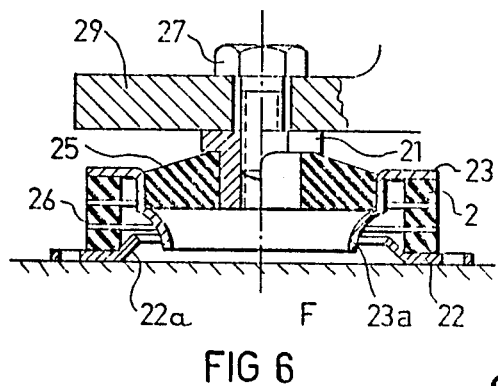
FIG. 6 is a sectional view illustrating another mount constructed in accordance with the present invention.
Figure 7:
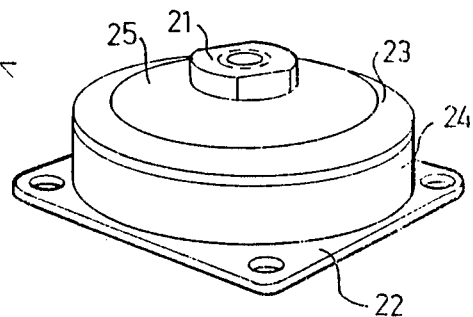
FIG. 7 is a three dimensional view illustrating the mount of FIG. 6.

FIGS. 6 and 7 illustrate another embodiment of the invention, but still including the basic members as in the embodiment of FIGS. 2 and 3, namely: Three rigid members 21, 22, 23 corresponding to rigid members 1, 2 and 3, respectively in FIGS. 2 and 3; and two elastic members 24, 25 corresponding to elastic members 14, 15, respectively, in the embodiment of FIGS. 2 and 3. In this arrangement, however, elastic member 24 which is strained in compression under axial loads, is interposed between rigid members 22 and 23; whereas elastic member 25, strained in shear under elastic loads, is interposed between rigid members 21 and 23.

For this purpose, rigid member 22, to be secured to the frame chassis, is formed with a frusto-conical extension 22a; and rigid member 23 is similarly formed with a frusto-conical extension 23a received within and spaced from the edges of extension 22a. In addition, rigid member 21, to be secured to the equipment, indicate that 29, by bolt 27, is formed with a threaded bore receiving the bolt. Further, elastic member 25 is of annular shape and is bonded between, and coaxial with, rigid member 21 and 23; and elastic member 24 is also of annular shape and is interposed, and coaxial with, rigid members 22 and 23 to which it is bonded. In addition, elastic member 24 is made of a plurality of sections, in this case three sections, each separated by a rigid metal layer, parallel to the plane of shear, to stiffen member 25 under compression without significantly effecting it in shear, and also to enhance the dissipation of heat generated in the elastic member.

Figure 1:
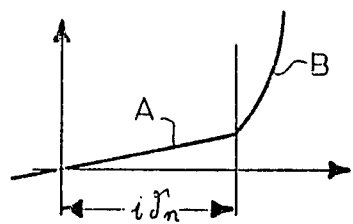
FIG. 1 is a diagram illustrating the deflection-force characteristics of a shock and vibration mount constructed in accordance with the present invention.

It will be seen that the mount illustrated in FIGS. 6 and 7 operates in the same manner as described above with respect to FIGS. 2 and 3 and as illustrated in FIG. 1. Thus, under axial loads, elastic member 25 is strained in shear until the lower end of section 23a of rigid member 23 limits against the supporting surface, whereupon elastic member 24 then becomes strained in compression; whereas under radial loads, member 24 is strained in shear until extension 23a engages extension 22a, whereupon member 25 becomes strained in compression.

The mount illustrated in FIGS. 6 and 7 permits even a lower construction than that of FIGS. 2 and 3 where a particularly low mount construction is desired, elastic member 24 may be reduced in thickness, and therefore the rigid sheets 26 should be included to prevent unwanted buckling.

Figure 8:
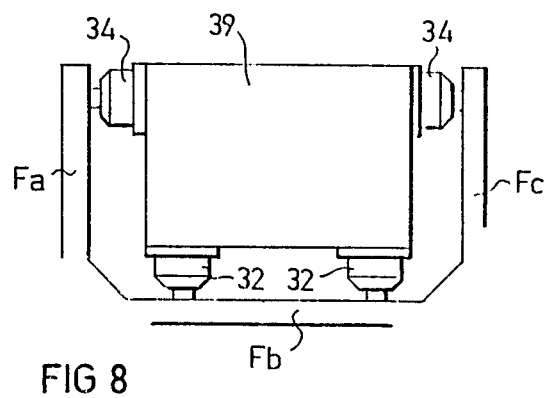
FIG. 8 is an elevational view illustrating one manner of mounting a piece of equipment using a plurality of mounts according to the present invention.

FIG. 8 illustrates a preferred arrangement of using a plurality of mounts, therein designated 31-34, for holding the equipment, therein designated 39 in all directions. For this purpose, the supporting structure on which the equipment is to be mounted, for example a supporting frame or rack, is provided with three legs 35a, 35b, 35d, enclosing three sides of the mounted equipment 39 with two of the mounts 32, 33 being provided between the equipment and the center mounting leg, and two further mounts 31, 34 being provided between the equipment and the other two legs.

Figure 9:
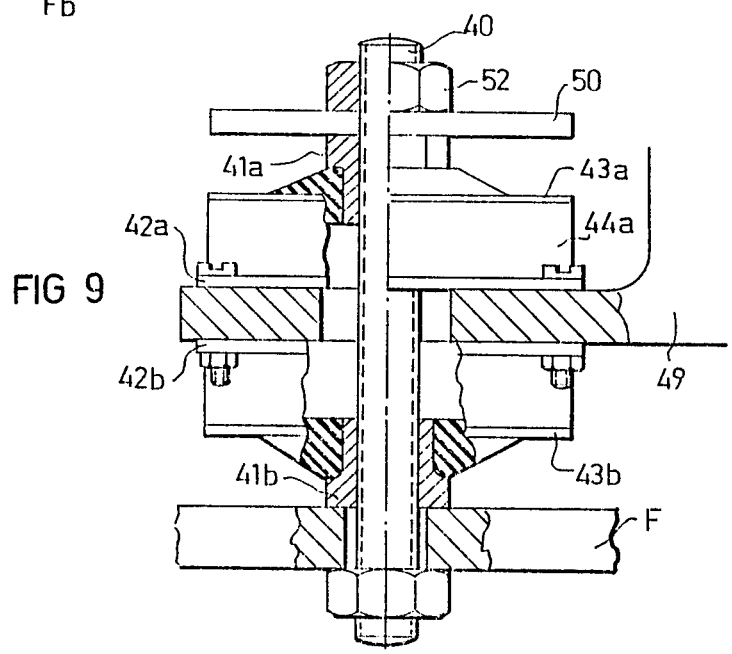
FIG. 9 is a sectional view illustrating another manner of mounting a piece of equipment in accordance with the present invention.

It is to be noted that the mounts described above limit the shearing deflection when loaded radially or axially in compression, but not in tension. Therefore, if an arrangement such as illustrated in FIG. 8 is not practical for any particular application, the mounting arrangement illustrated in FIG. 9 may be used. In this mounting arrangement, the various members of the mount are provided in pairs, and are connected together by a bolt 40. The mounting arrangement illustrated in FIG. 9 is similar to that of FIGS. 6 and 7, there being two rigid members 41a, 41b corresponding to rigid member 21 in FIGS. 6 and 7; two rigid member 42a, 42b, corresponding to members 22; two rigid members 43a 43b corresponding to rigid member 23; two elastic members 44a 44b, corresponding to elastic member 24; and two elastic members 45a, 45b, corresponding to elastic member 25. In the arrangement illustrated in FIG. 9, however, bolt 40 passes through all the foregoing members and secures them to a base plate 48 between the head of the bolt and rigid member 41b, and to mounting equipment between the two rigid members 42a, 42b. Bolt 40 also secures a bearing plate 50 between rigid member 41a and an end nut 51, to limit the shearing and to increase the compression of elastic members 44a, 44b.

While the invention has been described with respect to several preferred embodiments, it will be appreciated that many other variations, modifications and applications of the invention may be made.

What is claimed is:

1. A shock and vibration mount for mounting a supported device to a supported device, comprising:
   a first rigid end member to be mounted to one of said devices;
   a second rigid end member to be mounted to the other of said devices;
   an intermediate rigid end member between said first and second rigid members;
   a first elastic member fixed between said intermediate rigid member and one of said end rigid members such as to be strained only in compression under loads along a first orthogonal axis, and to be strained only in shear under loads along a second orthogonal axis;
   and a second elastic member fixed between said intermediate rigid member and the other of said end rigid members and disposed in series with said first elastic member such as to be strained only in shear under loads along said first orthogonal axis, and to be strained only in compression under loads along said second orthogonal axis;

both said elastic members having a low shear modulus as compared to their compression modulus so as to exhibit relatively low deflection under compression and relatively high deflection under shear.

2. The mount according to claim 1, including means for positively limiting the displacement of said elastic members in shear but not in compression.

3. The mount according to claim 2, wherein said first and second elastic members are of elastomeric material.

4. The mount according to claim 3, wherein at least one of said elastic members includes at least two sections of elastomeric material separated by a rigid layer parallel to the plane of shear such as to stiffen the elastic member under compression without significantly affecting it under shear.

5. The mount according to claim 4, wherein said rigid layer is of metal to thereby also enhance the dissipation of heat generated in the elastic member when subjected to vibration.

6. The mount according to claim 1, wherein said first elastic member is disposed coaxially to said first orthogonal axis in alignment with and between intermediate rigid member and said one end rigid member, and said second elastic member is of annular configuration and is disposed coaxially to said first orthogonal axis around said intermediate rigid member between it and said other end rigid member.

7. The mount according to claim 6, wherein
said intermediate rigid member includes an annular wall disposed coaxially between said two end rigid members and closed at one end by an end wall;
said first elastic member being a pad disposed between said one end rigid member and said end wall of the intermediate rigid member;
said second elastic member being of annular shape and disposed between said other end rigid member and said annular wall of said intermediate rigid member.

8. The mount according to claim 7, wherein said second elastic member includes at least two sections of elastomeric material separated by a rigid metal layer parallel to the plane of shear such as to stiffen the elastic member under compression without significantly affecting it in shear, and also to enhance the dissipation of heat generated in the elastic member when the mount is subjected to vibration.

9. The mount according to claim 1, wherein one of said end rigid members is formed with apertured lugs for attaching it to the supporting device.

10. The mount according to claim 9, wherein said apertured lugs are in an annular flange formed in said one end rigid member.

11. The mount according to claim 9, wherein said apertured lugs are in inwardly bent extensions formed in said one end rigid member.

12. The mount according to claim 1, wherein said first elastic member is of annular shape and is disposed in alignment with and between said intermediate rigid member and said one end rigid member; and said second elastic member is also of annular shape and is disposed around said intermediate rigid member and said other end rigid member.

13. The mount according to claim 12, wherein said intermediate rigid member and said other end rigid member are both of annular shape and are coaxial to each other and to said one end rigid member; both said intermediate and one end rigid members being formed with coaxial extensions such that the extension of said other end rigid member limits against the supporting device under loads applied along said first orthogonal axis, and against the extension of said intermediate rigid member under loads applied along said second orthogonal axis.

14. The mount according to claim 13, wherein said first elastic member includes at least two sections of elastomeric material separated by a rigid metal layer parallel to the plane of shear such as to stiffen the elastic member under compression without significantly affecting it in shear, and also to enhance the dissipation of heat generated in the elastic member when the mount is subjected to vibration.

15. The mount according to claim 1, wherein the stressed areas of the two elastic members are substantially equal in cross-section.

16. The mount according to claim 1, wherein there are two pairs of each of said rigid member and elastic members, one pair being between said supporting device and supporting device, and the other pair being between one of said devices and a bearing plate limiting shear and increasing compression of the elastic members.

17. A shock and vibration mount for mounting a supported device to a supporting device, comprising:
a first rigid member to be mounted to the supported device;
a second rigid member to be mounted to the supporting device;
a third rigid member between said first and second rigid members;
a first elastic member fixed between said first and third rigid members such as to be strained only in compression under loads along a first orthogonal axis, and to be strained only in shear under loads along a second orthogonal axis;
and a second elastic member fixed between said second and third rigid members and disposed in series with said first elastic member such as to be strained only in shear under loads along said first orthogonal axis, and to be strained only in compression under loads along said second orthogonal axis;
both said elastic members being of elastomeric material having a low shear modulus as compared to the compression modulus and exhibiting relatively low deflection under compression and relatively high deflection under shear;
and means for positively limiting the displacement of said elastic members in shear but not in compression.

18. The mount according to claim 17, wherein at least one of said elastic members includes at least two sections of elastomeric material separated by a rigid metal layer parallel to the plane of shear such as to stiffen the elastic member under compression without significantly effecting it in shear, and also to enhance the dissipation of heat generated in the elastic member when the mount is subjected to vibration.

19. The mount according to claim 17, wherein said second rigid member is of annular shape and is disposed around and coaxial with said first rigid member;
said third rigid member including an end wall aligned with said first rigid member, and an annular wall disposed coaxially around said first rigid member and coaxially with respect to said second rigid member between it and said first rigid member;

said first elastic member being in the form of a pad disposed between said first rigid member and said end wall of the third rigid member;

said second elastic member being of annular shape and disposed between said second rigid member and said annular wall of said third rigid member.

20. The mount according to claim 17, wherein:

said second rigid member is of annular shape and is coaxial with said first rigid member;

said third rigid member is also of annular shape and is coaxial with and between said first and second rigid members;

said first elastic member is of annular shape between said second and third rigid members;

said second elastic member is also of annular shape and is between said first and third rigid members; and said third rigid member includes an extension limiting against the supporting device under loads applied along said first orthogonal axis, and against said second rigid member under loads applied along said second orthogonal axis.

* * * * *